(12) United States Patent
Colverson et al.

(10) Patent No.: US 9,423,032 B2
(45) Date of Patent: Aug. 23, 2016

(54) ANNULAR SEAL CAVITY THROAT BUSHING

(71) Applicants: Andrew Colverson, Doncaster (GB); Stephen Martin Shaw, Sheffield (GB)

(72) Inventors: Andrew Colverson, Doncaster (GB); Stephen Martin Shaw, Sheffield (GB)

(73) Assignee: AES Engineering Ltd., Rotherham (GB)

(*) Notice: Subject to any disclaimer, the term of this patent is extended or adjusted under 35 U.S.C. 154(b) by 0 days.

(21) Appl. No.: 14/267,471

(22) Filed: May 1, 2014

(65) Prior Publication Data
US 2014/0325791 A1 Nov. 6, 2014

(30) Foreign Application Priority Data
May 1, 2013 (GB) .................................. 1307882.9

(51) Int. Cl.
*F16L 5/02* (2006.01)
*F16J 15/34* (2006.01)
*F16J 15/18* (2006.01)

(52) U.S. Cl.
CPC ............ *F16J 15/3404* (2013.01); *F16J 15/183* (2013.01); *Y10T 16/063* (2015.01)

(58) Field of Classification Search
CPC ........... F16J 15/18; F16J 15/182; F16J 15/34; F16J 15/183; F16J 15/3404
USPC .................................... 277/510, 511, 512, 516
See application file for complete search history.

(56) References Cited

U.S. PATENT DOCUMENTS

| | | | | |
|---|---|---|---|---|
| 2,776,172 A * | 1/1957 | Deitrickson | .................... | 384/16 |
| 2,864,631 A * | 12/1958 | Kemp | .................... | 277/346 |
| 3,013,826 A * | 12/1961 | Sharp | .................... | 277/529 |
| 3,655,207 A * | 4/1972 | Schettler | .................... | 277/529 |
| 3,907,307 A * | 9/1975 | Maurer et al. | .................... | 277/513 |
| 4,340,204 A * | 7/1982 | Herd | .................... | 251/327 |
| 4,451,047 A * | 5/1984 | Herd et al. | .................... | 277/539 |
| 4,474,382 A * | 10/1984 | Hjelsand | .................... | 277/587 |
| 4,572,519 A * | 2/1986 | Cameron et al. | .................... | 277/512 |
| 4,878,677 A * | 11/1989 | Larkins et al. | .................... | 277/511 |
| 5,305,854 A * | 4/1994 | Wheeler | .................... | 184/24 |
| 5,395,469 A * | 3/1995 | Suggs et al. | .................... | 156/173 |
| 5,921,554 A * | 7/1999 | Derian et al. | .................... | 277/516 |
| 5,979,483 A * | 11/1999 | Zapalac | .................... | 137/15.01 |
| 6,834,862 B2 * | 12/2004 | Wilkinson | .................... | 277/510 |
| 7,314,218 B2 * | 1/2008 | Hughes | .................... | 277/349 |
| 2003/0026718 A1 * | 2/2003 | Dziver et al. | .................... | 417/423.9 |
| 2004/0026876 A1 * | 2/2004 | Prinz | .................... | 277/628 |

FOREIGN PATENT DOCUMENTS

WO    WO 2007129080 A2 * 11/2007 ............. F04D 29/10

* cited by examiner

*Primary Examiner* — Kristina Fulton
*Assistant Examiner* — Eugene G Byrd
(74) *Attorney, Agent, or Firm* — Edwin D. Schindler

(57) ABSTRACT

An annular seal cavity throat bushing includes an inner annular surface having a substantially latitudinal channel with the channel being provided with at least one orifice to allow fluid communication between the inside of the bushing and the outside of the bushing. The bushing is further provided with at least one groove extending substantially longitudinally from one end of the bushing to the channel. The groove has at least one tapered edge which increases the width of the groove along its length.

8 Claims, 4 Drawing Sheets

ANNULAR SEAL CAVITY THROAT BUSHING

BACKGROUND OF THE INVENTION

1. Technical Field of the Invention

The present invention relates to devices known as throat bushings, which are commonly used to improve the environment of seal packing positioned at the entrance to a seal cavity in rotating fluid equipment.

2. Description of the Prior Art

Sealing equipment of various types is used in pumps in a variety of different industries for a variety of different purposes and applications. In order for the sealing equipment, which includes packing, bushing and mechanical seals, to operate continuously without premature failure its environment must be free from contaminants. In order for this to be the case, a number of different techniques and accessories are used, however this patent is limited to accessories that are used with packing, called throat bushing.

P.C.T. Patent Application Publication No. WO 2007/129080 A2 teaches that one such solution for this issue is called the SpiralTrac seal, which is an annular bushing which is placed at the entrance to a seal cavity of a pump, the cavity being defined by a portion of the pump housing, a shift that extends through the cavity, and a means for sealing a cavity itself. The sealing may take the form of a mechanical seal or packing material. The bushing includes a tapered central surface, which has a spiral groove formed in its wall and which extends from adjacent to the outer surface of the bushing towards the cavity entrance. The spiral groove decreases in diameter down to the innermost diameter of the bushing, which defines a small angular gap around the shaft.

As the shaft rotates, any particulate material that enters the seal cavity during operation of the pump will be centrifugally forced into the spiral groove and will flow towards the gap around the shaft. The particulate material is then forced outwardly through the gap to the exterior of the seal cavity.

In P.C.T. Patent Application Publication No. WO 2007/129080 A2, an apparatus is described that overcomes the disadvantages of the SpiralTrac product by having more than one groove ensuring that should the contaminants build up in such a way that the groove is rendered impassable there is another that will ensure the flow of contaminants is maintained. The superior design also includes a groove, which is rotated in clockwise direction and another which is in anti-clockwise direction, thereby allowing the product to operate irrespective of the direction of shaft rotation.

Through manufacturing trials it has be subsequently learned that this construction, although superior to the SpiralTrac design, is very costly to manufacture. This is due to the nature of the grooves and vanes requiring complex geometry to be machined onto the inner surface of the product and so meaning that jigging must be manufactured for each size variant which allows the product to be secured on a machine post splitting.

SUMMARY OF THE INVENTION

Accordingly the present invention is directed to an annular seal cavity throat bushing comprising;

an inner annular surface and an outer annular surface, the inner surface comprising a substantially latitudinal channel, the channel being provided with at least one orifice to allow fluid communication between the inside of the bushing and the outside of the bushing; and, the bushing being further provided with at least one groove extending substantially longitudinally from one end of the bushing to the channel, wherein the groove comprises at least one tapered edge, thereby increasing the width of the groove along its length.

It may be advantageous that the other edge of the groove is substantially perpendicular to the end of the bushing. Alternatively, it may also be tapered.

Having one of the sides of the groove tapered, or sloped, allows for easier machining of the groove. Additionally, as the edges are substantially longitudinal to the bushing, rather than spiralled, the fluid path is reduced, thereby reducing the time that debris and contaminates may be within the groove and thus reducing the likelihood of the debris and contaminants from building up and rendering the groove impassible. Any debris and contaminants are swiftly removed from within the bushing through the orifice.

Advantageously, the width of the, or each, groove increases as it approaches the channel. This creates a pressure differential that encourages the flow of fluid through the groove.

The seal cavity throat bushing may be used with rotating fluid equipment having a seal cavity which is defined by a rotary shaft having an axis, the shaft housing surrounding at least a portion of the shaft, and a sealing device engaging the shaft and said housing at one end of the cavity. In such a use, the said bushing may comprise:

i) An outer annular surface divided into preferably three portions, the first being located at the exit of said cavity and the third being located at the entrance of said cavity and the third being located there between; wherein said first and third portions have minimal diametric clearance from said seal cavity and said second portion having a greater clearance;

ii) An inner annular surface divided into preferably three portions, the first being located at the exit of said cavity and the third being located at the entrance of said cavity and the second being located there between, wherein said first and third portions have minimal diametric clearance from said shaft and said second portion having a greater clearance;

iii) One or more orifices longitudinally located in said second inner annular surface and extending radially outward thereby creating a passage between said second inner annular surface and said second outer annular surface;

iv) One or more grooves longitudinally located on said third annular inner surface extending from the entrance of said cavity and extending longitudinally toward said second inner annular surface, the width of the said groove increases along its length with its widest point being located adjacent to the third portion of said inner annular surface.

The use of a tapered groove makes for a simplified manufacturing process and a more straight-forward construction. Additionally, the lack of a spiralled groove makes a more efficient device, especially with the introduction of at least one tapered edge.

Preferably, said grooves are radially located in line with at least one of said orifices. Where the grooves lead fluid directly to the orifice, there is less distance to travel and so the device operates in an efficient manner.

More preferably, the depths of said grooves increase along the longitudinal length with the deepest portion residing closest to said orifices. This creates a pressure differential, thereby encouraging the fluid flow along the groove.

More preferably, the widths of the grooves in opposing halves of the bushing are created so that one groove creates a clockwise slope and the other groove creates an anticlockwise slope. Having grooves in different directions allows for the operation of the bushing regardless of the direction of rotation of the shaft around which it is positioned.

Preferably, one or more annular grooves are located in said first and second outward annular surfaces allowing toroidal sealing members to reside therein creating a seal between said grooves and said cavity. The use of O-ring seals provides for a simple and efficient sealing mechanism.

Preferably, the throat bushing diameter is divided into two portions of equal size about the axis shaft axis thereby creating a split throat bushing; creating a split throat bushing allows for easier transportation and installation of the bushing.

More preferably, the split throat bushing is divided post machining and so when said halves are reassembled the annular surfaces are not circular.

More preferably, the splits are located in a plane substantially perpendicular to a plane connecting the grooves. Providing the split at what equates to a 12 o'clock and 6 o'clock position with the grooves at 3 o'clock and 9 o'clock, when viewed from one end, creates a bushing that is easy to orientate and install. Other dividing lines could be used, but it is more intuitive for the installer when the above dividing lines are used.

More preferably, at least one hole capable of securely holding a pin is located on the split surface of one of the halves and the opposite half having holes located concentrically to said pins but with a larger diameter than the pin, thereby allowing the halves to be assembled together. Location pins and holes make installation more precise and efficient.

Preferably, a throat bushing has more than one threaded hole is located radially on said surface and adjacent to said cavity exit, thereby allowing bolts to be fitted thereby aiding fitment of said bushing.

Preferably, the material of construction is metallic and of a non-sparking nature. Whilst other materials may be used, metallic and non-sparking materials are advantageous for the devices upon which the bushings are likely to be used.

Other objects and features of the present invention will become apparent when considered in combination with the accompanying drawing figures, which illustrate certain preferred embodiments of the present invention. It should, however, be noted that the accompanying drawing figures are intended to illustrate only select preferred embodiments of the claimed invention and are not intended as a means for defining the limits and scope of the invention.

BRIEF DESCRIPTION OF THE DRAWING FIGURES

In the drawing, wherein similar reference numerals and symbols denote similar features throughout the several views.

DETAILED DESCRIPTION OF THE DRAWING FIGURES AND PREFERRED EMBODIMENTS

Figure 1:
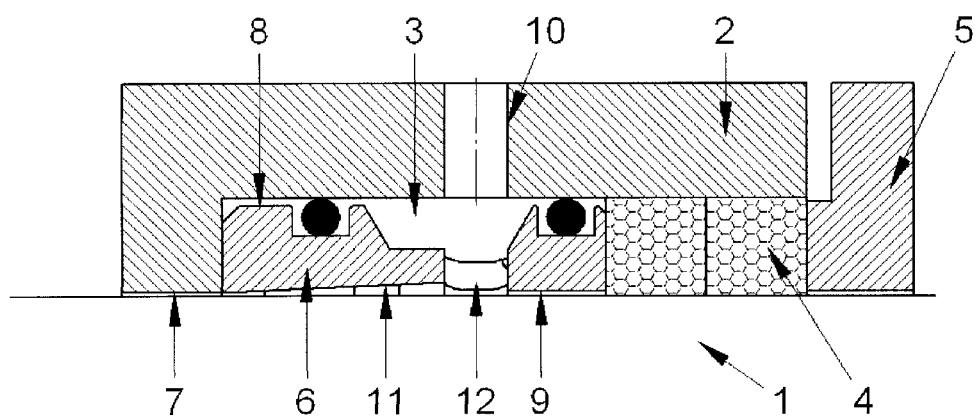
FIG. 1 is a longitudinal section of part of the rotary equipment including the throat bushing in accordance with the present invention.

Referring to the accompanying drawing figures, the rotary equipment shown in FIG. 1 includes a shaft 1, which is free to rotate about its axis in operation and an equipment housing 2, which is stationary in operation. A sealing cavity 3 resides between the equipment housing 2 and the shaft 1, and located in this cavity 3 resides a sealing means in the form of packing rings 4, which are compressed by a gland ring 5 which is secured to the housing by bolts.

A throat bushing 6 is located between said packing rings 4 and the entrance of said cavity 7. The throat bushing comprises an outer annular surface 8, which is in close proximity to the inner diameter of the cavity 3, and an inner annular surface 9 which is in close proximity to the outer diameter of the shaft.

The outer annular surface 8 is divided into three portions: the first portion is located at the exit end of the cavity adjacent to the packing 4; the third portion is located adjacent to the entrance of the cavity; and the second portion is located between said first and third portions. In order for the bushing to seal against a cavity bore one or more O-rings are located in grooves in the first and third annular portions, thereby being in communication between the annular surface and the cavity bore ensuring that the bushing 6 is radially constrained in the cavity.

It is preferable that the second portion of the outer annular surface 8 is a smaller diameter than the first and third portions to allow the flow of fluid around the cavity allowing it to exit the cavity through one or more ports 10 in the cavity.

The inner annular surface 9 is also divided into three portions: the first portion is located at the exit end of the cavity adjacent to the packing 4; the third portion is located adjacent to the entrance of the cavity; and the second portion is located between said first and third portions. The second portion is has preferably a larger diameter than the first and third portions, thereby allowing a greater clearance from the shaft 1. One or more grooves 11 are incorporated onto the third portion of the inner annular surface 9 providing a path for the fluid entering the cavity 3 to pass into the second portion. This groove 11 is preferably sloped in so that the deeper section is adjacent to the second portion, thereby creating lower pressure at this end and so forcing the fluid to travel down this groove 11. One or more orifices 12 are created between the second portions of the inner 9 and outer annular surfaces 8, thereby allowing the fluid which travels down the groove 11 to exit the seal cavity 3 via the port 10. This ensures that any contaminants are removed prior to them entering the packing.

Figure 2:
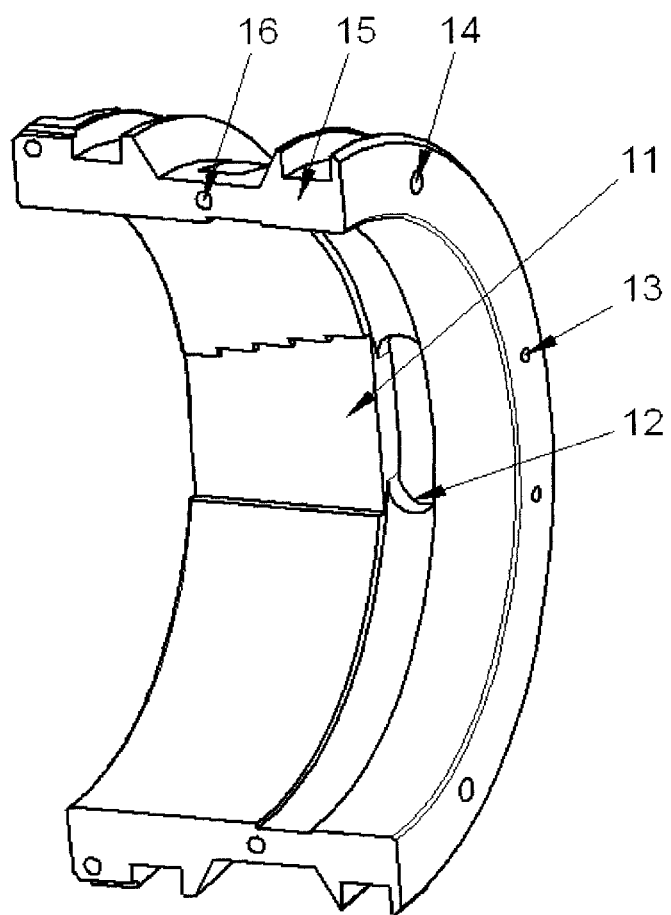
FIG. 2 is an isometric view of half of a throat bushing in accordance with the present invention.

In FIG. 2, it can be seen that the present invention has the groove 11 radially aligned with one or more of the orifices 12, thereby allowing the fluid to have the shortest route to exit the bushing. It also aids in the manufacture of the bushing as all the machining operations are done on the same plane as one another thereby reducing the complexity of the geometry and so the sophistication of the machine required. The groove 11 has varying width along one edge becoming wider as it passes from the end of the bushing 3 that is adjacent to the entrance of the cavity 7 and the second portion of the inner annular surface. This widening means that there is a pressure differential and so encouraging the fluid to flow down the groove and so carrying any contaminants with it. The orifice 12 in the present invention is the same width as the groove 11 aiding the fluid flow.

It can be seen in FIG. 2 that the second portion of the inner annular surface 9 is elliptically shaped with the greater diameter being radially aligned with the orifice 12 and the groove 11, thereby encouraging the flow of fluid out of the orifice.

One or more orifices 13 are located on the planar surface of the bushing that is in direct communication with the packing 4 and provides a passageway between the orifice 12 and the packing 4, thereby allowing fluid to pass from the orifice 12 directly to the packing 4. Due to the sizing of these orifices 13, the contaminants cannot pass and so clean fluid is only passed into the packing 4. However, a gauze or filter may be positioned on or in the orifices 13.

One or more threaded orifices 14 are also located on the same surface as the passageway orifices 13 allowing threaded bolts to be fitted and for aiding removal of the bushing from the cavity 3.

Figure 3:
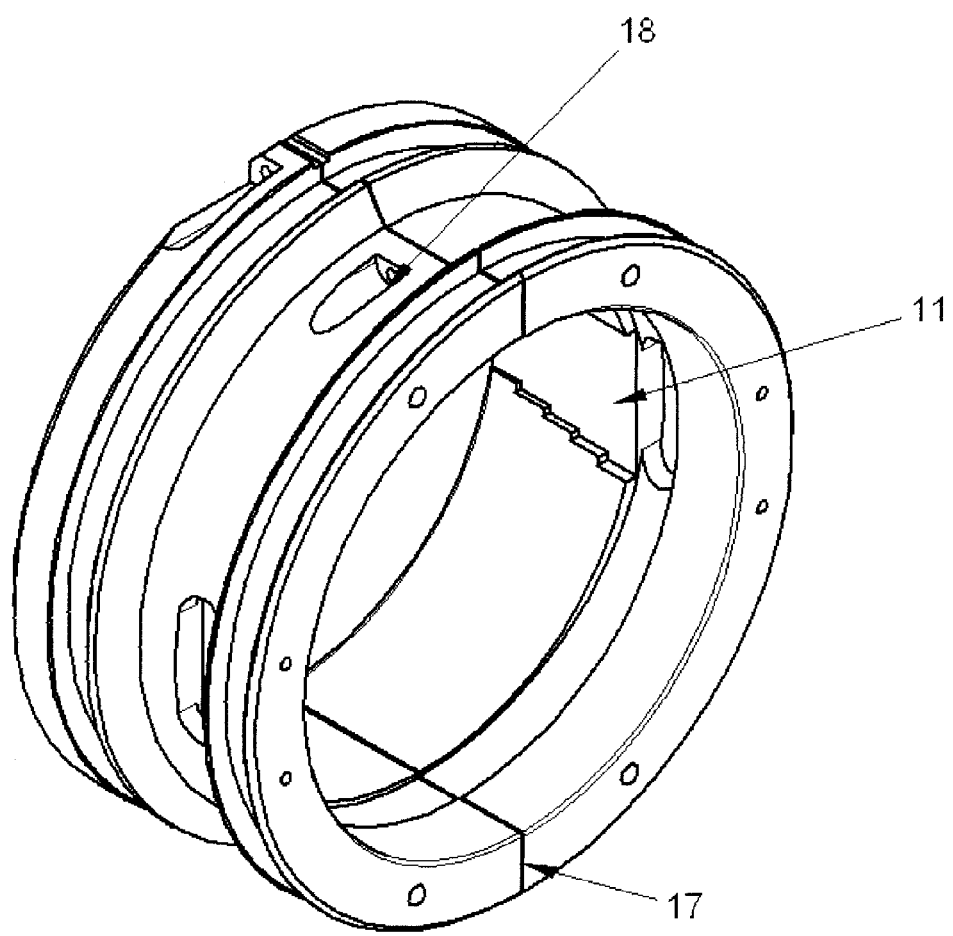
FIG. 3 is an isometric view of the throat bushing of FIG. 2 in its assembled state; and, FIG. 4 is an end view from the cavity exit end of the bushing of FIG. 3 showing the angling of the grooves.

Located on the split, or divided, surface 15 of each half of the bushing is one or more orifices 16, wherein pins can be located allowing the halves of the bushing to be assembled together creating the bushing assembly as shown in FIG. 3.

The split line 17, as shown in FIG. 3, is manufactured after all turning and milling operations are completed via wire eroding ensuring that the material removed is as small as possible meaning that the bushing does not need re-machining after the splitting operation. The clearances between the inner annular surface 9 and the shaft 1 and the outer annular surface 8 and the cavity bore 2 are suitably large enough to allow the non-circularity of the bushing post splitting to be fitted without interference with either of them. In order to aid the machining of the pin holes 16 slots 18 are also machined on the outer annular surfaces 8.

Figure 4:
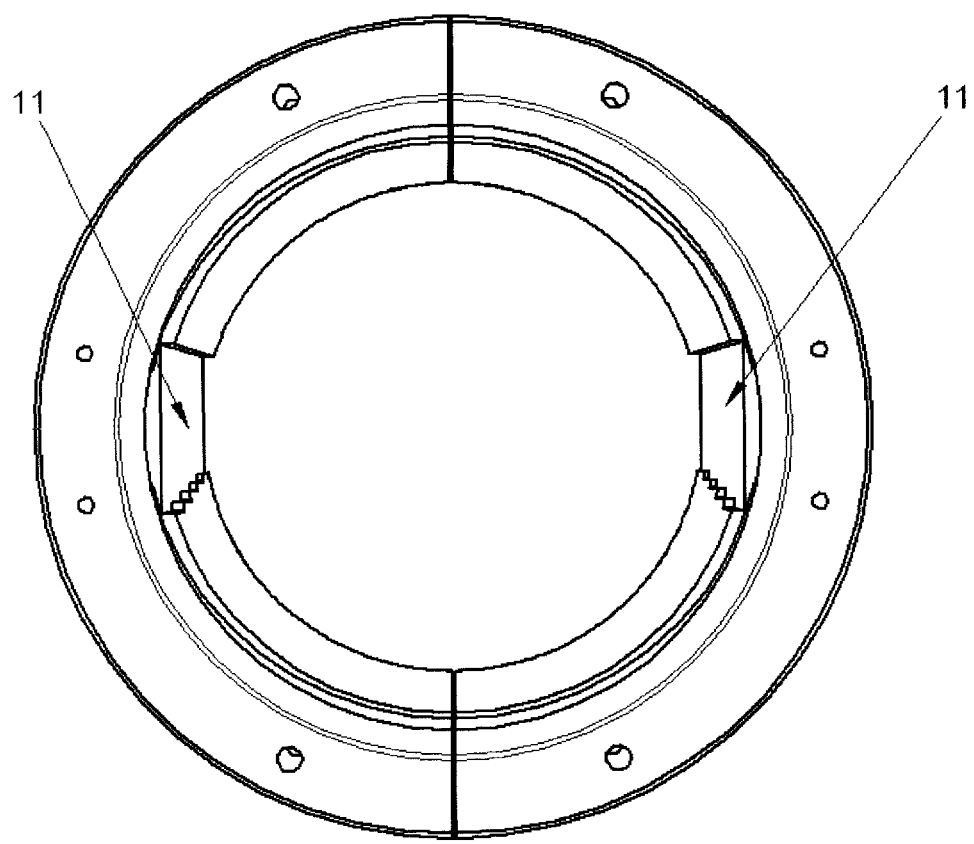

The end view of the present invention, as shown in FIG. 4, shows that the grooves 11 can be machined prior to the splitting operation using a T-cutter machining tool, thereby negating the need for jigging to be manufactured for each size variant. It can be seen in this view that in the present invention there are two grooves 11; one sloping in a clockwise direction and the other sloping in an anticlockwise direction thereby ensuring that the fluid flow is generated in both shaft directions.

Where the grooves and at least one wall thereof are described as being tapered or sloped, they may be stepped or otherwise graduated to result in a narrowing of the width of the groove along its length.

The grooves may be provided with vanes to assist with directing the fluid towards the orifices 12.

The bushing may have more than one groove in each half. For example, two grooves may be provided in each half, preferably equally spaced there. The two grooves in each half may be of the same or opposite (clockwise or counter-clockwise) direction.

The device may be split, or divided, into three or more parts to make transportation easier.

The substantially latitudinal channel on the internal annular surface may extend part or all of the way around the inside of the bushing. It might be desirable to align it slightly away from perfectly latitudinal, especially where the orifices are not position directly at the end of the groove.

While only several embodiments of the present invention have been shown and described, it will be obvious to those skilled in the art that many modifications may be made to the present invention without departing from the spirit and scope thereof.

What is claimed is:

1. An annular seal cavity throat bushing, comprising:
a bushing having a groove extending substantially longitudinally from one end of said bushing to a substantially latitudinal channel, the groove having at least one circumferentially tapered edge for increasing width of the groove along its length, the width of the groove increasing as the groove approaches the substantially latitudinal channel and depth of the groove increasing along a longitudinal length of the groove as the groove approaches the substantially latitudinal channel; and,
an inner annular surface having the substantially latitudinal channel with the substantially latitudinal channel having an orifice for allowing fluid communication between an inner side of said bushing and an outer side of said bushing.

2. The annular seal cavity throat bushing according to claim 1, wherein the groove of said bushing is radially located substantially in line with the orifice of the substantially latitudinal channel.

3. The annular seal cavity throat bushing according to claim 1, wherein said bushing includes an additional groove with said groove being a first groove and said additional groove being a second groove, said first groove creating a clockwise slope and said second groove creating an counter-clockwise slope.

4. The annular seal cavity throat bushing according to claim 3, wherein said first groove having the clockwise slope is positioned in a first half of said bushing and said second groove having the counter-clockwise slope is positioned in a second half of said bushing.

5. The annular seal cavity throat bushing according to claim 1, wherein said bushing includes an additional groove with said groove being a first groove and said additional groove being a second groove, said first groove creating a counter-clockwise slope and said second groove creating an clockwise slope.

6. The annular seal cavity throat bushing according to claim 5, wherein said first groove having the counter-clockwise slope is positioned in a first half of said bushing and said second groove having the clockwise slope is positioned in a second half of said bushing.

7. The annular seal cavity throat bushing according to claim 1, wherein said the substantially latitudinal channel further includes a first annual groove located on a first side of the orifice and a second annual groove located on a second side of the orifice for allowing toroidal sealing members to reside therein for creating a seal between said first annual groove and said second annual groove and a seal cavity.

8. The annular seal cavity throat bushing according to claim 1, wherein said bushing and inner annular surface are made of a metal that is not prone to creating sparks.

* * * * *